(12) United States Patent
Buitenhuis (10) Patent No.: US 12,397,950 B2
(45) Date of Patent: Aug. 26, 2025

(54) GRIPPER FOR A HANDLING DEVICE

(71) Applicant: ROYAL HOUDIJK B.V., Maardingen (NL)

(72) Inventor: Menze Jan Buitenhuis, Vlaardingen (NL)

(73) Assignee: ROYAL HOUDIJK B.V. (NL)

( * ) Notice: Subject to any disclaimer, the term of this patent is extended or adjusted under 35 U.S.C. 154(b) by 187 days.

(21) Appl. No.: 18/108,311

(22) Filed: Feb. 10, 2023

(65) Prior Publication Data

US 2023/0257144 A1  Aug. 17, 2023

(30) Foreign Application Priority Data

Feb. 11, 2022 (NL) .................................. 2030908

(51) Int. Cl.
| | |
|---|---|
| *B65B 35/16* | (2006.01) |
| *B65B 25/16* | (2006.01) |
| *B65B 57/10* | (2006.01) |

(52) U.S. Cl.
CPC .............. *B65B 35/16* (2013.01); *B65B 25/16* (2013.01); *B65B 57/10* (2013.01)

(58) Field of Classification Search
CPC ......... B65B 23/14; B65B 25/16; B65B 35/16; B65B 35/36; B65B 35/52; B65B 57/10; B65G 2201/0205; B65G 57/302
See application file for complete search history.

(56) References Cited

U.S. PATENT DOCUMENTS

| | | | | |
|---|---|---|---|---|
| 3,927,508 A | * | 12/1975 | Campbell, III | ......... B65B 35/44 |
| | | | | 53/154 |
| 4,013,179 A | * | 3/1977 | Fluck | ................... B65G 59/063 |
| | | | | 221/268 |

(Continued)

FOREIGN PATENT DOCUMENTS

| | | |
|---|---|---|
| EP | 1661830 A1 | 5/2006 |
| EP | 3699098 A1 | 8/2020 |

(Continued)

*Primary Examiner* — Anna K Kinsaul
*Assistant Examiner* — Himchan Song
(74) *Attorney, Agent, or Firm* — Shumaker, Loop & Kendrick, LLP; Patrick B. Horne (57) ABSTRACT

The present disclosure relates to a gripper for forming slugs of flat baked products, comprising a longitudinal retainer arranged for individually loading the flat baked products and comprising elongated wall elements extending along a longitudinal direction of the gripper for enclosing the retainer forming a retainer space for retaining the flat baked products a loading element, arranged for displacement of at least a contact surface thereof which is located adjacent a segment of the circumference of a loaded flat baked product near a free end of the retaining space; and wherein the gripper is arranged for displacement of the contact surface of the loading element enabling individually loading the flat baked products for forming the slug in the retainer space, and wherein the gripper is further arranged for rotating the longitudinal retainer over a rotation-axis in a plane parallel to a supporting surface of the conveyor means at the input for bringing the slug from a horizontal vertical orientation into a vertical horizontal orientation, and wherein at least one of the elongated wall elements is arranged for displacement thereof for unloading the vertical horizontally oriented slug into the conveyor means of the packing device.

17 Claims, 8 Drawing Sheets

(56) References Cited

U.S. PATENT DOCUMENTS

| | | | | |
|---|---|---|---|---|
| 4,736,570 A * | 4/1988 | Hardage | ................. | B65B 23/16 |
| | | | | 53/500 |
| 6,438,925 B1 * | 8/2002 | Straub | .................... | B65B 5/108 |
| | | | | 53/244 |
| 8,407,973 B2 * | 4/2013 | Finkowski | ............. | B65B 35/52 |
| | | | | 53/247 |
| 2012/0000748 A1 * | 1/2012 | Chauhan | ................ | B65B 23/14 |
| | | | | 198/575 |

FOREIGN PATENT DOCUMENTS

| IT | 20120010 A1 | 3/2014 |
|---|---|---|
| WO | 2011014534 A1 | 2/2011 |

* cited by examiner

GRIPPER FOR A HANDLING DEVICE

The present invention relates in general to a gripper for a handling device.

More in particular, the present invention relates a gripper for a handling device which is arranged for forming slugs of flat baked products such as biscuits and cookies, wherein the flat baked products are infeed by loading the flat baked products individually from a conveyor means at an input of the handling device, and outfeed by unloading the slugs into a conveyor means of a packing device at an output of the handling device, wherein the slugs are defined as roll of on-edge oriented flat baked products.

The handling of flat baked products such as biscuits and cookies typically involves transporting the products from an infeed to an outfeed, e.g. from an oven or subsequent cooling conveyor towards a further handling device or directly into a packing device.

During the transport, the orientation of the individual products, the pattern or distribution of the products and the grouping typically requires modification. For example, biscuits may arrive from the oven in a random pattern of individual biscuits but may even arrive in a bulk in which some of the biscuits partly or fully overlap each other. Eventually these need to be organized into pile or roll formations or combinations thereof in which for example piles are combined with rolls or in which several rolls or piles are packed by a single foil wrap.

A particular type of packing with a packing device is known as slug packing in which a slug of flat baked products such as biscuits and cookies is formed and in which the slug may be defined as a roll of a plurality of adjacent or abutting on-edge oriented flat baked products.

Slug packing or also known as slug wrapping is a typical way of packing biscuits or cookies or similar products on-edge, in which these products can have any shape from round, square to rectangular or other polygon shape.

Forming slugs from an individual supply of flat baked products at random or organized pattern involves several steps. The steps may include grouping of the individual products into a stack, roll or roll-like orientation, compacting the stack or roll, separating them into slugs, which is also known as slug length separation, and transferring the slugs into the conveyor means of the packing device.

These steps have drawbacks as they may add handling time, lower the overall handling speed and increase the length of the production line and increase machine footprint.

Moreover, since some or most of these steps may even be performed by separate devices or separate stages within a single devices, it involves transfer which add complexity in respect of matching, synchronizing and more in general smooth handover between the devices or the stages within the devices.

It is a goal of the present disclosure to provide for a handling device arranged for forming slugs of flat baked products such as biscuits and cookies, in which at least some of the above mentioned drawbacks are reduced or resolved.

According to a first aspect of the present disclosure, this goal is achieved with a gripper for a handling device arranged for forming slugs of flat baked products such as biscuits and cookies, wherein the flat baked products are infeed by loading the flat baked products individually from a conveyor means at an input of the handling device, and outfeed by unloading the slugs into a conveyor means of a packing device at an output of the handling device, wherein the slugs are defined as rolls of on-edge oriented flat baked products, the gripper comprising:

- a longitudinal retainer arranged for individually loading the flat baked products and comprising elongated wall elements extending along a longitudinal direction of the gripper for enclosing the retainer forming a retainer space for retaining the flat baked products;
- a loading element, arranged for displacement of at least a contact surface thereof which is located adjacent a segment of the circumference of a loaded flat baked product near a free end of the retaining space; and
- wherein the gripper is arranged for displacement of the contact surface of the loading element enabling individually loading the flat baked products for forming the slug in the retainer space, and wherein the gripper is further arranged for rotating the longitudinal retainer over a rotation-axis in a plane parallel to a supporting surface of the conveyor means at the input for bringing the slug from a vertical orientation into a horizontal orientation, and wherein at least one of the elongated wall elements is arranged for displacement thereof for unloading the horizontally oriented slug into the conveyor means of the packing device.

In view of the present disclosure, the gripper may rotate and be displaced according to several definitions. The rotation of the gripper around a longitudinal axis is considered the rotation (R) around the Z-axis. The tilting the gripper is the rotation around the X-axis, which is perpendicular to the longitudinal axis. The tiling of the gripper may also be achieved by a rotation around the Y-axis, which is also perpendicular to the longitudinal axis Z. The gripper may also be displaced in a linear manner, e.g. the gripper may move along the Z-axis in which is defined as the Z-suspension, or move along an X-Y axis in which is referred to as the X-Y suspension. The rotation may be used to change the orientation of the gripper in respect of the individual products or the conveyor means, whereas the suspension may be used to move towards or away from the conveyor and thus products on the conveyor (Z-suspension), whereas the X, Y suspension allows to align with the position (X,Y) of the product on the conveyor means. Accordingly, the same applies to dropping or unloading the slug at the conveyor of the packaging device.

Slug wrapping refers to the packing by a packing device of slugs of flat baked products. Slug wrapping requires a way of volumetric loading, manipulating and portioning of stacked flat baked products.

Flat baked products, in view of the present disclosure, is defined as cookies, biscuits crackers or similar baked products which have a substantially flat orientation and may have a round, square, rectangular or polygon shape. Throughout the present disclosure such flat baked products may generally be referred to, in short, as products.

Slugs are formed for stacks of a plurality of products which are oriented on-edge, meaning that the flat surface of the product is in a vertical orientation.

Typically, these products may arrive from the oven or oven stations in a horizontal orientation in which the flat surface of the products rest on a conveyor belt. The products arrive downstream of the oven typically in a random pattern in which the individual products preferably are spaced apart but may also abut or even partly or fully overlap.

To form slugs from these products the volumetric handling devices should manipulate the orientation of the products to bring the products from a horizontal into a vertical orientation, manipulate the location by transporting it from the oven or oven station towards the packing device or packing station, and separate a continuous stack of products into slugs. Such separation is done with a slug length separator in which a retractable or extending element separates the slugs from the continuous stack.

All the required steps of the volumetric handling device for forming the slugs add handling time, may lower overall handling capacity, and increase complexity in aligning and synchronizing in between the steps.

These steps may be combined by a robot. With a robot such as a pick-and-place robot or delta-robot, steps may be combined or performed in a sequence by a single robot. The robot may for example have a gripper which picks-up or loads individual products with a vacuum gripper and places or unloads them into the conveyor of the packing devices. This is however challenging as it involves manipulation of the product orientation, unloading the product while maintaining the already partly formed slug in the conveyor. Moreover, this is time-consuming as the robot can only handle one product at a time.

The inventor had the insight that a robot would have advantages over conventional slug forming volumetric handling devices but would require combination of steps. e.g. by first loading several products before unloading a complete slug directly into the conveyor of the packing devices. Moreover, the products would also need to be brought from a horizontal orientation into a vertical or at least substantially vertical orientation, e.g. in case the conveyor of the packing device is at an angle.

The gripper according to the present disclosure further has advantage that its configuration eases the changeover between different setups of slugs or slug configurations, e.g. increasing or decreasing the number of individual products in a slug is easier with the proposed gripper. The loading element and retainer configuration may further be arranged to process different shapes, dimensions or tolerances of the products, without the need for equipping the robot with a different dedicated gripper, as is currently common.

Combining the loading of several products with unloading them as a slug into the conveyor of the packing devices and the manipulation of the orientation would require redesign of the robot and in particular the gripper thereof.

The gripper according to the present disclosure is arranged to combine these steps such that they can be performed by a single robot.

To this end, the gripper comprises a longitudinal retainer and a loading element. The longitudinal retainer is arranged for individually loading of the products, meaning that the retainer defines a retainer space being substantially cylindrically shaped and corresponding to the slug which is to be formed. The retainer is upon loading oriented in a vertical manner, meaning that the longitudinal axis or direction of the retainer is perpendicular to a supporting surface of the conveyor which supplies the products and thus on which the products rest in a vertical orientation. The retainer is open at a first free end directed, upon loading towards the supporting surface of the conveyor. This way the retainer can be placed over a single or individual product. The products may be arranged on the conveyor in a relatively random, disorganised manner. Accordingly, the gripper may be arranged to move towards an individual product which is thus disorganized or organized in a random manner on the conveyor means. Once this is done, a loading element of the gripper is displaced such that a contact surface thereof grips or abuts the loaded product. In particular, the loading element is located near the free end of the retainer such that the contact surface thereof is located adjacent a segment or part of the circumference of the loaded product near the free end of the retainer. In particular, the products may have a relatively low precision accuracy or relatively high tolerance, when the retainer is placed over them, the loading element effectively searching for the product and centralizing it with respect to the retainer by contacting/gripping the contact surface of the product. The loading element allows higher tolerances of the products, and/or allows less accuracy in the alignment of the product and the retainer. Upon loading, the loading element may move away such that the retainer opens and the retaining space becomes accessible, whereas when the product is loaded, the loading element may move towards the loaded product to close the retainer and retaining space. The retainer is thus closed by locking the latest loaded product at the free end of the retainer. Once this is done, the robot may move the gripper towards a next product and place the retainer exactly above and on top of this next product. Then the loading element may be displace to move the contact surface thereof away from the already loaded product and lower the retainer such that the next product becomes the latest loaded product which closes the retainer by the loading element to abut its contact surface against it. As such, the previously loaded product is pushed upwards to allow the latest product to be taken up by the retainer, so that the products are loaded against a direction of the gravity. Once sufficient products are loaded the robot may move the gripper from the conveyor at the infeed toward the conveyor of the packing device. During, before or after moving the gripper, the pile of products loaded into the retainer are reoriented from a vertical into a horizontal orientation and in accordance with the orientation required for the slug to be wrapped as such. Once the slug or pile is in a horizontal orientation and located above a conveyor of the packing device, the retainer unloads the products all at once or a as a slug. To this end, the retainer comprises elongated wall elements which extend along a longitudinal direction of the retainer and enclose the retainer and form the retainer space for the products. These wall element, or at least one thereof, but preferably two or even more, are upon unloading the slug into the conveyor of the packing device, arranged or configured for displacement or movement thereof in respect of the retainer such that the retaining space opens up over at least a section of the wall over the full length of the retainer, e.g. similar to the jaws of a gripper. In particular, the conveyor of the packing device comprises a flightbar or flightbar mechanism. This way the individual products may be loaded through an open end of a cylindrical retainer (or in case the products have a square, rectangular or other shapes, the retainer may be shaped accordingly, i.e. correspondingly), kept in their during loading of further individual products by the loading element, and once the required amount of products are loaded, the displaceable elongated wall elements allow the retainer to sufficiently open over a longitudinal direction of the gripper in a jaw-like manner such that the slug may be placed smoothly into the conveyor. Accordingly, the loading element and displaceable elongated wall elements provide separate loading and unloading means which allows combining several steps into a single device and single stage of operation of the robot such that all or at least some of the above mentioned drawbacks are obviated.

In an example, the gripper is arranged for slugs in a tray, wherein the conveyor of the packing device is accordingly arranged for conveying said trays and wherein said slugs formed by said gripper are unloaded into said trays in said conveyor means of said packing device. Preferably, the conveyor means of the packing device comprise a flighbar wherein the trays are positioned in said flightbar. Further, the packing device may comprise a de-nester for de-nesting a stack of trays into the conveyor means or flightbar of said packing device. The trays may be configured for a single slug consisting of one single stack of flat baked products on-edge, or several parallel slugs of flat baked products on-edge, or a combination of one or several slugs of flat baked products on-edge combined with one or several stacks of flat baked products in horizontal orientation. In an example, the trays are placed into the conveyor means of the packing device by a separate or integrated de-nester. The de-nester provides a tray infeed conveyor, tray synchronization and filled tray discharge. The trays may arrive from the de-nester and received by the tray infeed conveyor, and preferably buffered side by side. Preferably, the flightbar is servo driven or driven by any linear drive system, and arranged to be synchronized with the slug formed by the gripper at said outfeed thereof. The servo's or other linear drive system synchronize the trays to the product slug and the completed rolls are gently placed in the positioned tray by the gripper. The trays may be outfeed by the tray discharge conveyor and can be turned short side leading when required.

In an example, the packing device is a flow wrapping packing device.

In an example, the conveyor means at the loading of the products or infeed of the handling device and the conveyor means on which the slugs are unloaded or outfeed, may be disposed parallel to each other, or even in-line such that the conveyor means of the outfeed form an extension of the conveyor of the infeed. Alternatively, the conveyor of the outfeed may also be displaced perpendicular or at least substantially perpendicular to the conveyor of the infeed. In yet another example, the conveyor means of the outfeed may be disposed at an angle with respect to the conveyor means of the infeed.

In an example, the gripper is arranged for at least three modus of operandi, comprising a loading, unloading and retaining modus, wherein in the loading modus the contact surface of the loading element is moved away from the segment of the circumference of the loaded flat baked product, for allowing further flat baked products to be loaded into said retainer, and wherein in the retaining modus the contact surface of the loading element is moved towards the segment of the circumference of the loaded flat baked product for retaining said loaded flat baked product near the free end of the retainer space, for retaining loaded flat baked products in said retainer, and wherein in the unloading modus at least one elongated wall element is moved away from a centre line of the retainer for unloading the slug.

In a further example, the gripper is arranged for a further modus of operandi defining a gripper movement.

In a further example, the gripper is arranged to be operated in the modus of operandi in a sequential manner, wherein a modus of operandi has ended before a further modus of operandi is started.

In a further example, the gripper is arranged to be operated in modus of operandi in at least a partially overlapping manner, wherein before a modus of operandi has ended, a further modus of operandi has started.

In the above example, the gripper may be arranged for smooth operation of the modus of operandi, e.g. the gripper may move simultaneous with the retaining modus, such that the loaded products are retained in the retainer during movement. The gripper may however also move simultaneous or preferably partly simultaneous to the retaining modus such that for example, at the end of the movement path, the gripper already starts the loading modus. That means that even before the gripper has arrived at the product which is to be loaded next, that the loading element already opens up such that no time is lost in opening the loading element upon loading the next product. The timing for starting the loading modus prior to the arrival at the next loading position and thus end of the movement modus, may be based on gripper speed, product speed or conveyor speed and inertia and/or momentum of the products already loaded in the retainer.

The gripper may also move simultaneous or partly simultaneous to the unloading, similar to the loading. That means, that even before the gripper has arrived at the unloading position, the elongated wall element or elements may start to open-up, or start the unloading modus, such in order be more time efficient.

In an example, gripper may comprise one single loading element and in a further example, the gripper may comprises two or three loading elements.

In an example, the loading element of the gripper may be configured to move relative movement of the products on the conveyor, or may be configured such that there is no movement relative to the product on the conveyor, in which configuration the static part of the gripper is moved relative to the movement of the product on the conveyor. The gripper has a static and moving parts, which move relative to the static parts and comprise the one or more elongated wall elements, and the one or more loading elements. The gripper may be configured such that the movement of the static part corresponds with the movement of the product on the conveyor which is to be loaded next. This way, the gripper first starts with a movement relative to the product to move the gripper towards the product and when it has arrived, the gripper follows the product for a predefined path by a certain length and/or time. During this path the gripper, more in particular the static parts thereof, follows the product and the distance between both remains equal for the full path. The loading element is then moved relative to the static parts of the gripper and thus the product to engage with the circumference of the product such that it is retained in the retainer. The loading may comprise pushing the product slightly towards and into and retainer space with the loading element. The gripper may however also be configured such that the loading element is kept constant with respect to the product that is to be loaded, such that the static part of the gripper moves toward the product for the product to be loaded into the retaining space. In a further example, these are combined, such that during the path or a segment of the path, the static gripper parts are moved towards the product, and the loading element also moves towards the product as well.

In an example, the gripper may be arranged for a loading modus of operandi wherein the contact surface of the loading element is moved away for the loaded product prior to the loading of a further product which is to be loaded next, and wherein the movement of and preferably the trajectory of the gripper is above a gravitational acceleration of the loaded products. In such an example, the loaded products may be retained in the retainer by moving beyond the gravitational acceleration. Hence, the gripper may move downwards towards a next product on the conveyor at such speed or acceleration that the gravitational acceleration is exceeded and the products are retained in the retainer by levitation. Preferably, the retainer may comprise a retaining element which is located opposite the free end of the retainer where the products are loaded. The retaining element is arranged to keep the loaded products in position within the retainer space, e.g. by a spring force or by the weight of the element. This way it movement of the loaded products with respect to the retainer is prevented during the levitation or acceleration of the gripper beyond the gravitational acceleration. In particular, the retaining element may be free to run along the length direction of the wall elements of the retainer when the gripper is in the loading modus, so that the position of the retaining element is dependent on the number of products in the retainer. Preferably, the retainer physically contacts the most upwards product in the retainer. The retaining element may be clamped in position when the gripper is in the retaining modus. Besides the above-mentioned effect that the retaining element may allow the gripper to move downwards with an acceleration higher than the gravitational acceleration, also when rotating the formed slug horizontally the retaining element advantageously clamps together all products in the retainer so that the slug of products is optimally controlled during the entire process of gripping the individual products to releasing the slug.

In an example, the displacement of the at least one elongated wall element upon unloading the horizontally oriented slug comprises pivoting the at least one elongated wall element over a pivoting-axis parallel to a centreline of and located along a circumferential wall of the longitudinal retainer.

In an example, the longitudinal retainer comprises two opposing elongated wall elements extending along a longitudinal direction of the gripper forming a jaw of the gripper, and wherein the displacement of the two elongated wall element upon unloading the horizontally oriented slug comprises pivoting the two elongated wall element over one or two pivoting-axis parallel to a centreline of and located along a circumferential wall of the longitudinal retainer.

In an example, the elongated wall elements comprise rods extending along a longitudinal direction of the gripper for enclosing the retainer forming a retainer space for retaining the flat baked products.

In an example, the elongated wall elements comprise deformable material disposed at least on a contact surface of the wall elements and the flat baked products.

In an example, the elongated wall elements comprise deformable material disposed at least on a contact surface of the wall elements and the flat baked products.

In an example, the at least one contact surface of the loading element comprises deformable material.

In an example, the loading element is comprised of deformable material.

In an example, the loading element comprises a hook portion that extends downwards with respect to the part of the loading element with which the circumference of the products is contacted, the hook extending under the bottom-most product when retaining/loading the products. This hook may optimally retain the products while minimizing the forces on the products so that the risk of breaking a product is minimized.

In particular, the hook portion may extend below a product to be loaded when loading a new product. To achieve this, the hook may push down the conveyor on which the product is arranged before the product is loaded in the retainer. To allow this displacement of the conveyor, the loading element may be biased by a spring member with respect to the walls of the retainer.

In an example the loading element may comprise a rotatable member, rotatable about an axis substantially parallel to the longitudinal direction of the retainer. In particular, the rotatable member may be arranged at the free end of the retainer, contact the lowermost product of the retainer when the gripper is in the retaining state and contact the conveyor when the gripper is in the loading state. The rotatable member may be rotatable inside and outside of a retaining volume defined by the retainer. The rotatable member may be arranged outside of the retaining volume when the gripper moves downwards to load a product, and may be sled under the product by rotating the rotatable member to get a hold of the product and load it.

In an example, the longitudinal retainer may be mounted in the gripper in a releasable manner, so that the longitudinal retainer may be removed from the gripper and replaced by another longitudinal retainer. This allows a malfunctioning retainer to be inspected/repaired while continuing operation of the gripper semi-instantly.

In an example, the gripper is further arranged for rotating the longitudinal retainer over a further-rotation-axis perpendicular to the rotation-axis.

In an example, the gripper comprises two, three or a plurality of loading elements, each being arranged for displacement of at least a contact surface thereof which is located adjacent a segment of the circumference of a loaded flat baked product near a free end of the retaining space, and wherein the loading elements are distributed around the free end of the retaining space for approximate equal distribution of the segments.

In an example, the gripper comprises one or more servos that may be integrated with the gripper. For example, one servo may affect the rotation from the vertical slug orientation to the horizontal slug orientation. The servo may be embodied as driving means for any of the rotations and/or displacements of the gripper and may preferably be integrated into the gripper as a direct-drive-means, meaning that the servo is positioned on gripper instead of having some sort of chain or other means to convey the power from the motor to the moving parts of the gripper. The use of one or more servo motors in the gripper has effect that such motors may be embodied in small and light-weight form factors, which allow integration into the gripper, but they also allow precise and dynamic positioning of the moving parts of the gripper, such that for example higher tolerances of the products are allowed or less accurate positioning of the gripper in respect of the product. The servo's also may provide feedback on for example the amount of power dissipated by the servo, which may be considered a driving feedback control input by which a controller of the servo determines that the contact surface of the loading element engages or contacts the product. This way additional sensor means, such a contact levers are no longer needed as feedback.

In an example, the gripper is configured for attaching to robot and in particular one of a delta-robot, scara-robot, linear robot, gantry robot, cylindrical robot or articulated robot.

In a second aspect, there is provided, a handling device arranged for forming slugs of flat baked products such as biscuits and cookies, the handling device comprising one or more robots having a gripper, wherein the flat baked products are infeed by loading the flat baked products individually by the robot from a conveyor means at an input of the handling device, and outfeed by unloading the slugs into a conveyor means of a packing device at an output of the handling device, wherein the slugs are defined as rolls of on-edge oriented flat baked products, the gripper of the comprising:

a longitudinal retainer arranged for individually loading the flat baked products and comprising elongated wall elements extending along a longitudinal direction of the gripper for enclosing the retainer forming a retainer space for retaining the flat baked products;

a loading element, arranged for displacement of at least a contact surface thereof which is located adjacent a segment of the circumference of a loaded flat baked product near a free end of the retaining space; and wherein the gripper is arranged for displacement of the contact surface of the loading element enabling individually loading the flat baked products for forming the slug in the retainer space, and wherein the gripper is further arranged for rotating the longitudinal retainer over a rotation-axis in a plane parallel to a supporting surface of the conveyor means at the input for bringing the slug from a vertical orientation into a horizontal orientation, and wherein at least one of the elongated wall elements is arranged for displacement thereof for unloading the horizontally oriented slug into the conveyor means of the packing device.

In an example, the robot comprises one of a delta-robot, scara-robot, linear robot, gantry robot, cylindrical robot or articulated robot.

In an example, the handling device comprises vision means for determining a position of each of the flat baked products at the infeed.

In a third aspect, there is provided a controller for controlling a robot of the handling device of any of the previous descriptions.

BRIEF DESCRIPTION OF THE DRAWINGS

The present disclosure will be explained in more detail below by means of examples of a device according to the present disclosure shown in the drawings, in which.

DETAILED DESCRIPTION

Figure 1:
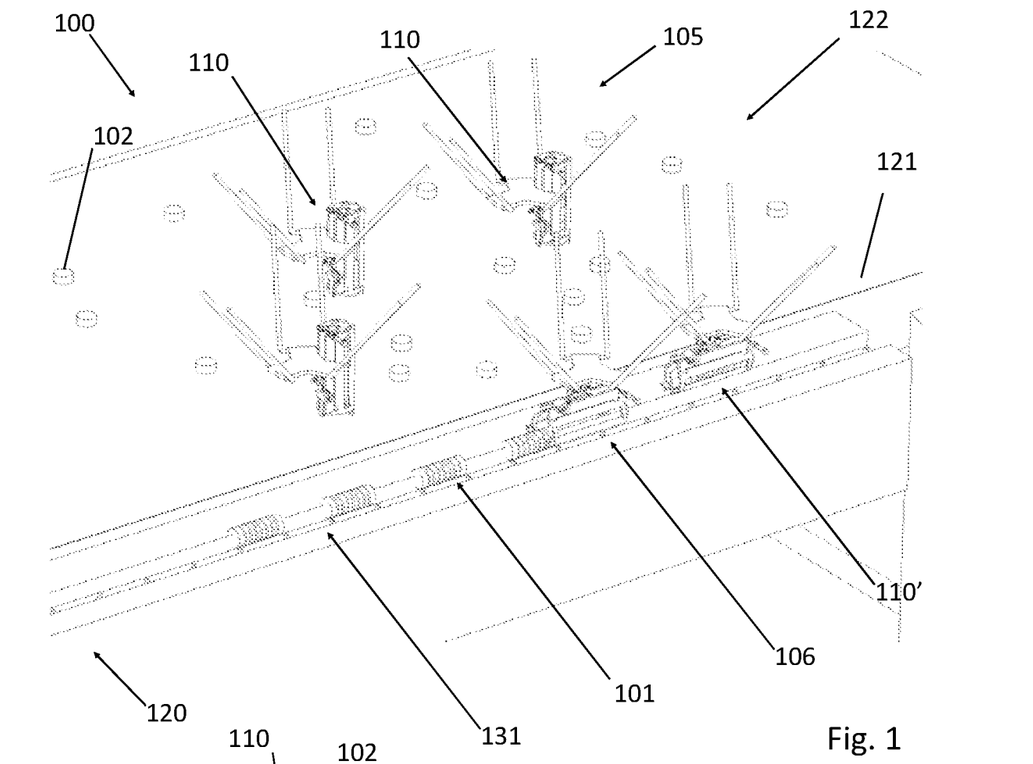
FIGS. 1 and 2, show different views of a handling device with a gripper according to the present invention.

In FIG. 1 a handling device 100 is shown. Such a handling device may also be known as a device for volumetric loading. Such devices 100 are arranged for high speed handling of flat baked products 102 such as biscuits, cakes, cookies, sandwich cookies, etc. In the examples shown in the figures, the products are round products 102 but the handling device 100 and gripper 110 thereof are also arranged for other shapes of products such as square, rectangular or any polygon shaped baked product as long as the product 102 is at least substantially flat. Meaning that the product has two opposing sides which define a main surface which surface in itself is flat or at least substantially flat. These products arrive upstream the production line and may arrive directly from an oven, oven-line or oven-stage (not shown). As the products arrive directly from the oven, they may be relatively unsorted, randomly arranged on the conveyor without any previous handling being performed to control the position of the products.

From the oven the products 102 are transported by a conveyor 121 from the conveyor means 121 of the handling device 110. The conveyor may be an integral part of the handling device 110, but may also be a separate conveyor, or form part of a device upstream of the product line such as a outfeed of the backing oven or cooling thereof.

Figure 2:
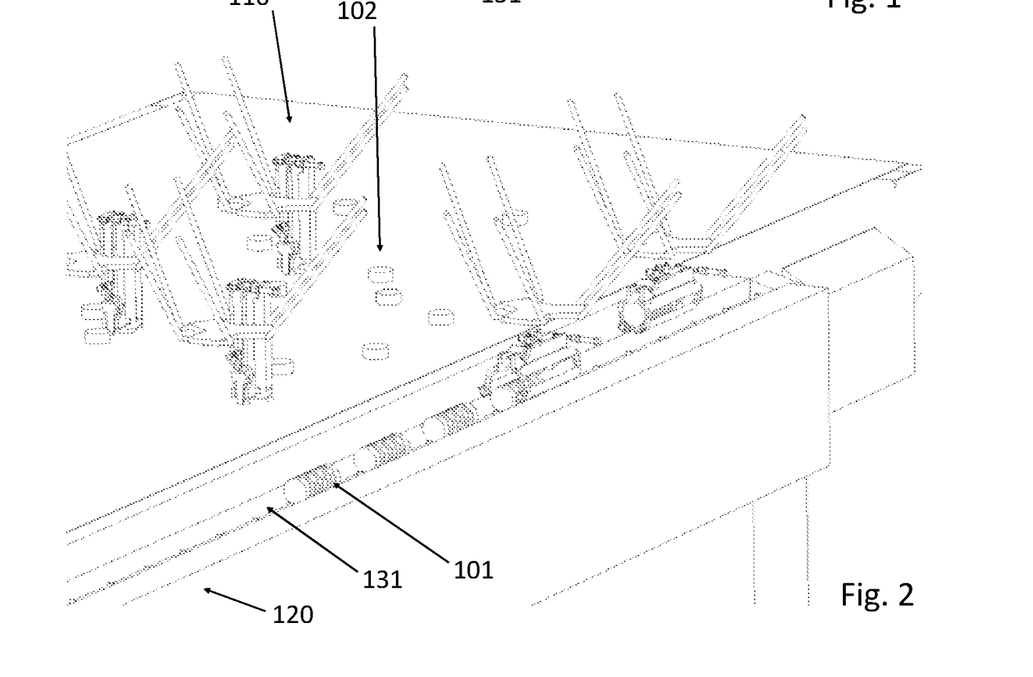

The products 102 are transported by the conveyor from an input side at the infeed towards an outfeed downstream of the product line, e.g. towards further devices for further handling. A preferred example is that these products are outfeed directly into the conveyor means 131 of a packing device 120 as shown in the example of FIG. 1 and FIG. 2. It is however emphasized that these are merely examples and that the products may also be placed into another conveyor means or other type of transport device. Examples thereof are tray devices such as tray de-nestors in which trays are de-nested from a stack of trays and in which individual trays are placed on a conveyor or a flightbar such that the products 102 which are formed into slugs 101 by the handling device 110, may be placed directly into theses trays (not-shown).

As indicated, the handling device 110 forms slugs 101 from individual flat baked products 102. These slugs 102 are further downstream 120 packed by a foil or a wrapping, which is also known as slug wrapping, which is a typical way of packing biscuits or cookies or similar products on-edge as shown in FIGS. 1 and 2. Typical for slugs 101 is that these are formed from several, e.g. 4, 5, 6, 7, 8, 10, 12, 14, 16, 18, 20 or more individual products 102 which products can have any shape from square to rectangular or other polygon shape, of the round form as shown in FIGS. 1 and 2.

Forming slugs 101 from an individual 101 supply of flat baked products 101 may be done by a random or organized pattern. In FIGS. 1 and 2 the products are supplied in random, which is the preferred embodiment as there are no specific requirements to the pattern, which implies that no further intermediate handling is required in between the present device and the oven, e.g. devices which reorganize the pattern or manipulate individual position an orientation of the products.

Alternatively, the products may be supplied in a particular pattern and/or any one or more of a particular mutual distance, position and orientation. For example, the products may have different main surface such as a printed top surface and unprinted back surface. In such a case, the printed top surface may be more or less suitable to be picked/loaded and placed/unloaded by the gripper of the present invention, or there may be a specific requirement to the mutual orientation such that each individual product is oriented similar having the top surfaces directed to the same side.

Before the randomly supplied products 102 can be packed, e.g. foil wrapped by a foil wrapping type of packing device 120, the slugs should be formed and be placed into a conveyor means 121 of or towards the packing device at or near the output 106 of the handling device 100.

Typically, and conventionally, the formation of the slugs 101 is done by a slug forming device in which products are for example placed one-by-one into the conveyor means 121 of the packing device, e.g. by a delta-robot, or wherein a slug forming device first forms an endless stack of products on-edge and then separates the endless stack into slugs of a particular length by a separation element.

With the handling devices 100 shown in FIGS. 1 and 2 an alternative is provided as the handling device 100 may comprise a robot such as a delta robot, and in particular, several robots as shown in the figures. These robots have grippers 110 as end-effectors. The grippers are arranged to load several products in a product-by-product basis, meaning that each product 102 is loaded individually. The loading is done by picking up or loading the products 102 at the input 105 side of the handling device 100. At his end, or indicated as the infeed, the products 102 are picked from the conveyor 121 and loaded into a longitudinal retainer, which details are shown in the further figures.

The longitudinal retainer is thus arranged for individually loading the products, meaning that the retainer defines a retainer space being substantially cylindrically shaped and corresponding to the slug which is to be formed. Thus, in case of round products 102 as shown in the figures, the retainer is cylindrical, whereas if these are square or rectangular, the retainer may have corresponding shapes.

The retainer is can be operated to be in a loading, retaining and unloading state. In the loading state, the retainer is arranged to open up in a vertical manner, meaning that the longitudinal axis L or direction of the retainer is perpendicular to a supporting surface (122) of the conveyor (121) which supplies the products 102 and thus on which the products rest in a vertical orientation known as orientation I which is shown in FIG. 1.

The retainer is upon loading open at a first free end directed, upon loading towards the supporting surface of the conveyor. Hence, similar to a hollow tube or cylinder with a removed bottom. This way the retainer can be placed over a single or individual product 102. Until the retainer is above or on the product, the retainer is configured to retain or keep the already loaded products into the retainer, for which the gripper is arranged with a loading element. Hence, the loading element keeps the loaded products in the retainer when the gripper is in a retaining state.

When the gripper placed is in position, and directly on top of, adjacent, or directly above a product which is to be loaded next, the gripper may be operated into a loading state in which the loading element moves away from the central longitudinal axis of the retaining element, such that a supporting surface of the loading element is no longer in contact with latest loaded product. This enables the gripper to further load the retaining space with the next product. That process is repeated until a predefined number of products has been loaded. As such, when a next product is loaded a previously loaded product is pushed upwards, towards the top of the retainer against, the direction of the gravitational force.

Once the products have been loaded into the retainer, the gripper may be rotated to rotate the retainer over a rotation-axis R in a plane parallel to the supporting surface 122 of the conveyor means 121 at the input 105 of the device 100. This is illustrated in FIGS. 1 and 2 as grippers 110 at the input 105 are in a vertical orientation I whereas the gripper 110' upon unloading at the output 106 are in a horizontal orientation. Hence, the rotation may be done at the input, at or near the output, or in between the travel from input to output.

Now the gripper is loaded, rotated, and the slugs are brought into horizontal orientation and located above the unloading position of the conveyor means 131 at the output, the gripper may be operated into an unloading state. In the unloading state, the gripper is controlled in such a way, by a controller thereof, that the elongated wall elements, which may be partly (as shown) or fully encompasses the wall of the retainer, open up or move away from the centre or central axis of the retainer. Hence, as in the FIGS. 1 and 2 shown, one of the elongated wall elements may be displaced to open-up in a jaw-like manner. The gripper may also have two or more displaceable elongated wall elements, similar to two jaws which open-up and displace relative from each other. The elongated wall elements may also open-up in a different manner, e.g. in a way in which the wall element is pivoted over the length or at a end position of the gripper. Now the slug of products can be unloaded easily into the conveyor or flightbar for further handling, transport, or directly to the packing device for wrapping.

Figure 3:
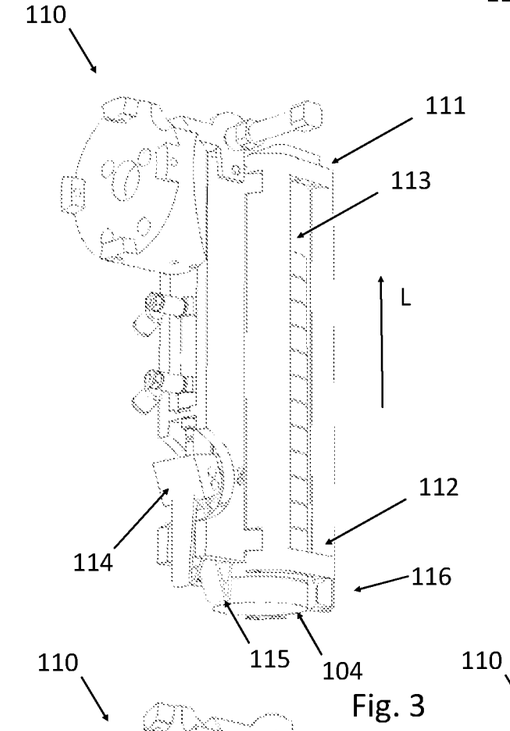
FIGS. 3, 4, 5, 6 and 7 show different views of a gripper according to the present invention in several operation states of loading products.

In FIG. 3, 4, 5 6 and several views are shown of a first embodiment of the gripper 110 for the handling device 100 of the present invention. The gripper 110 is shown in several stages. In the first figure, FIG. 3, the retainer 111 of the gripper 110 is fully loaded with several products. The products are retained in a retainer space 113 which is arranged to load several products in a slug-like orientation or stacked orientation. The products may be loaded at a free end 116 of the retainer, one at a time.

The loading element 114 is a displaceable element that may be configured as a gripper-finger having a contact surface 115 which is arranged to touch or grip on a segment 103 of the circumference 104 of the loaded product. The gripper 110 may also have several loading elements 114 which may be positioned in a similar manner around the opening or free end 116 of the retainer.

In FIG. 3 the retainer 110 is locked, meaning that the loading element 114 is touching the loaded product at the free end 116. This way the products cannot drop from the retaining space 113. Accordingly the gripper is in a retaining state.

Figures 4, 6:
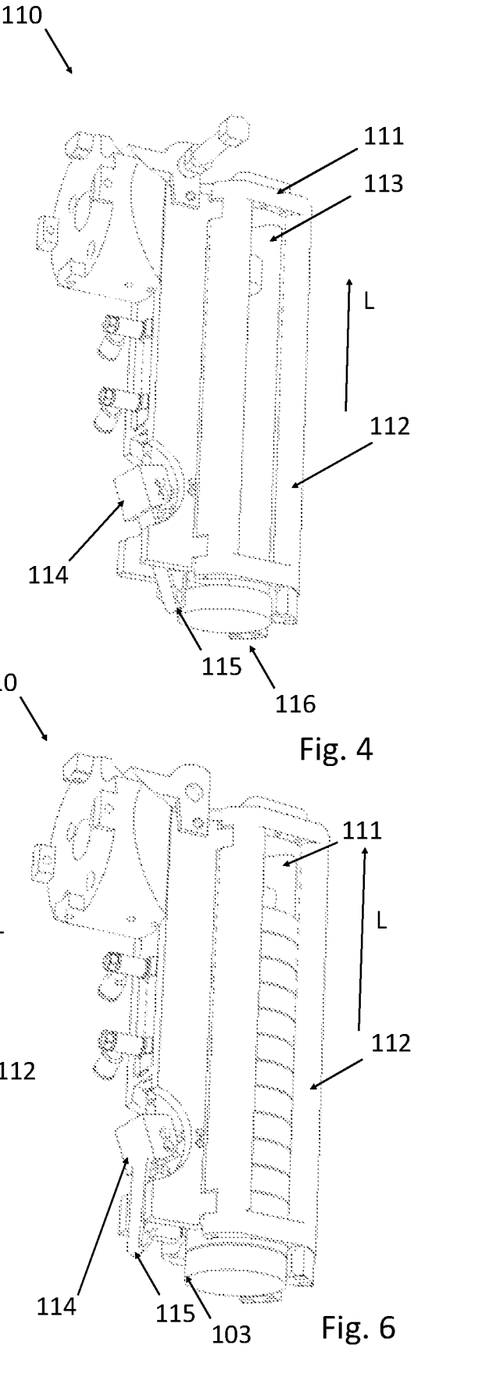

In the next figure, FIG. 4 the gripper is still in a retaining state, but currently there is only one product loaded in to the retainer space 113.

Figure 5:
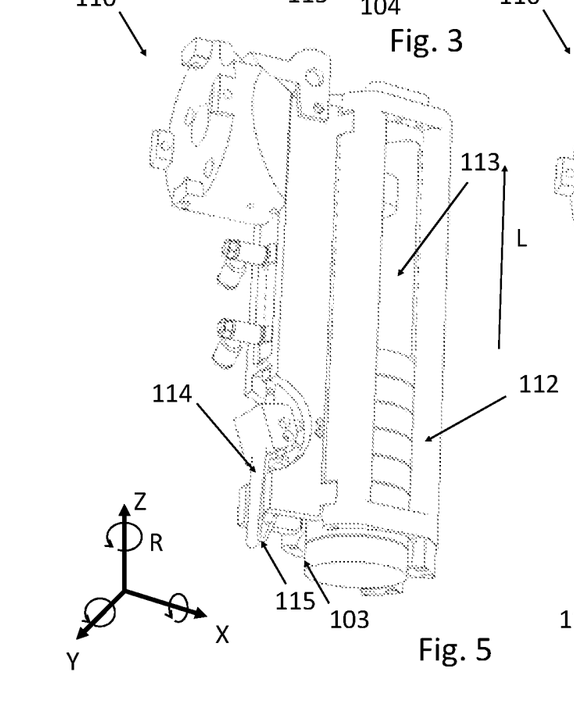

In FIG. 5 the loading element 114 or gripper finger 114 has moved away from the loaded product such that the products may move, or be loaded, through the retainer along longitudinal direction L. This is the loading state of the gripper 110.

In FIG. 6 the gripper is still in a loading state, as the loading element 114 is disengaged, but now all products have been loaded, and the slug length has been formed as required.

Figure 7:
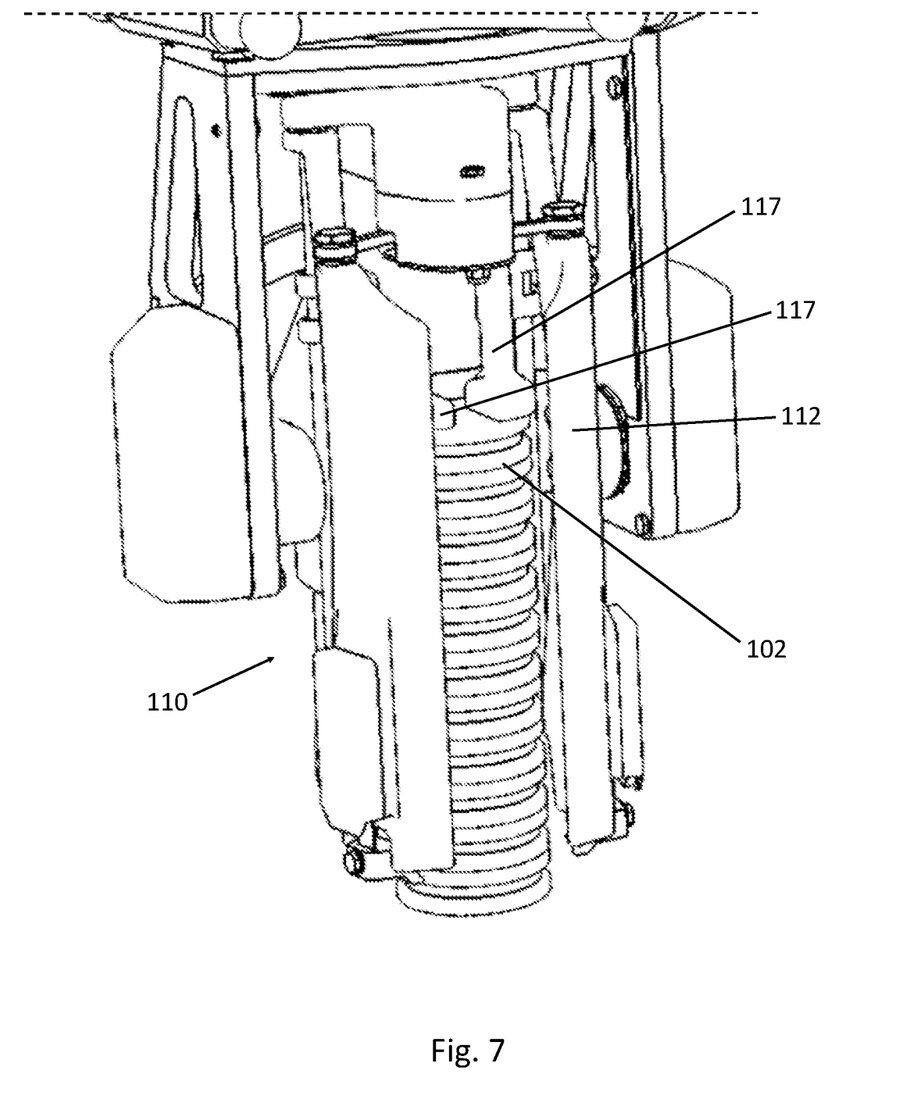

Finally, in FIG. 7 it is shown how a retaining element 117 or runner, pushes on the formed slug of products 102, to ensure that the individually picked products 102 remain in a fixed orientation with respect to each other and do not move around in the retaining volume inside the longitudinal walls 112 of the gripper 110 as the gripper 110 moves.

Figure 8A:
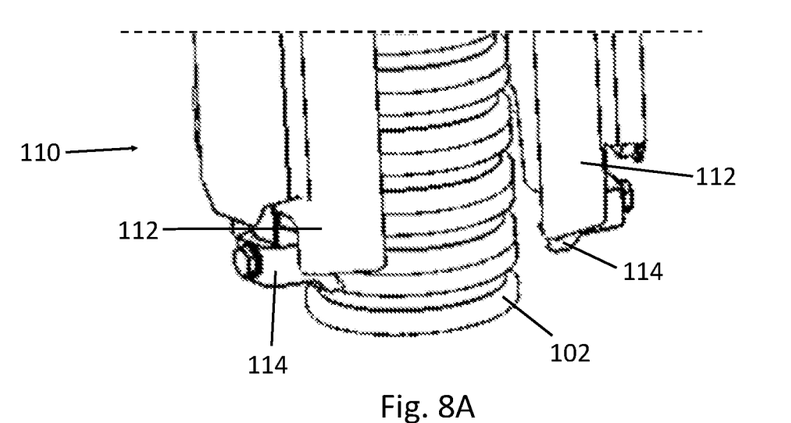
FIG. 8A-8C show different views of an alternative gripper according to the present invention, in operative states generally corresponding to FIGS. 4 and 5.
Figure 8B:
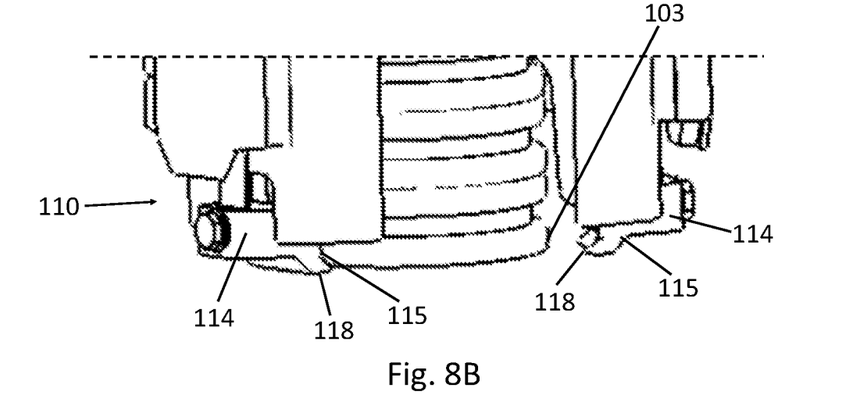
Figure 8C:
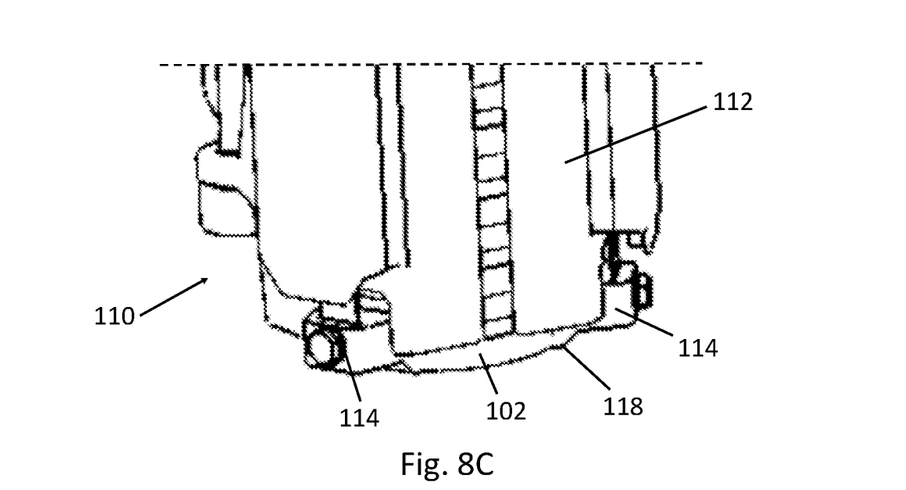

In FIG. 8A-8C an alternative gripper 110 is shown. In FIG. 8A the gripper is in a loading state comparable to what was shown on FIG. 5. Longitudinal walls 112 are moved away from each other, and the previously-formed slug of products is placed on top of a new-to-load product 102. In FIG. 8B the loading elements 114 have moved towards the product 102, with a contact surface 115 of the loading elements 114 about to contact the circumference 103 of the product 102 and with a hook 118 of the loading elements 114 about to be placed below the product 102. In FIG. 8c the product is loaded, the longitudinal walls 112 have moved back to the retaining position again and the gripper 110 is in the retaining state comparable to FIG. 3. The hook 118 of the loading element 114 supports the last-loaded product 102 from below while a contact surface 115 of the loading element 114 contacts the circumference of the product 102.

Figure 9A:
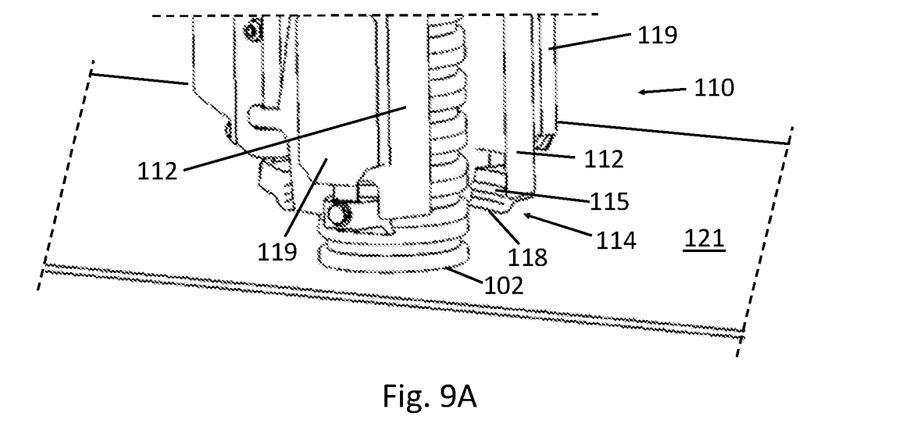
FIG. 9A-9C show different views of an alternative gripper according to the present invention, in operative states generally corresponding to FIG. 7A-7C.
Figure 9B:
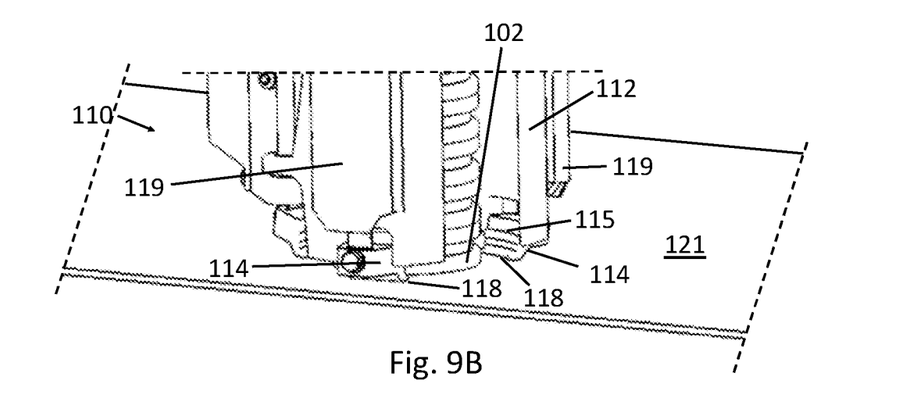
Figure 9C:
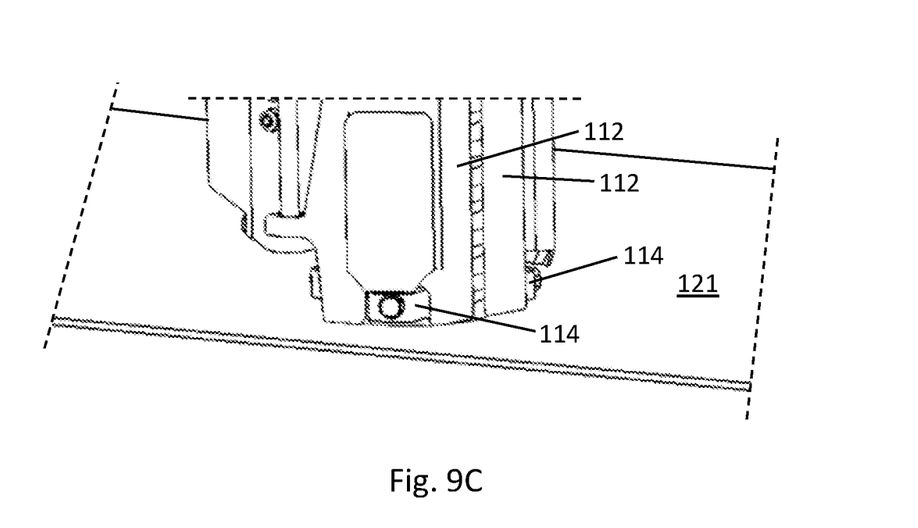

In FIG. 9A-9C a modification of the gripper 110 of FIG. 8A-8C is shown. FIG. 9A-9C generally correspond to FIG. 8A-8C in terms of loading operation. Particularly relevant is FIG. 9B, where it is shown how the loading element 114 physically contacts the conveyor 121 when loading the product 102. In particular, the loading element 114 may be downwardly biased by biasing element 119, so that the conveyor 121 is pushed downwards slightly at the location of the product 102, and the hook 118 of the loading element 114 may optimally grasp and load the product 102 from the conveyor 121.

Figure 10A:
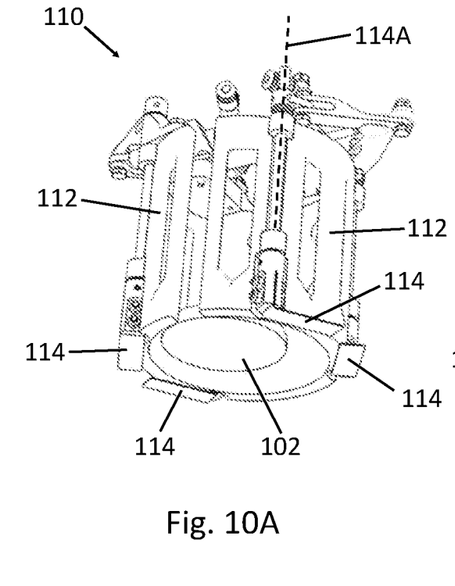
FIG. 10A-10C show different views of an alternative gripper according to the present invention, in operative states generally corresponding to FIG. 8A-8C.
Figure 10B:
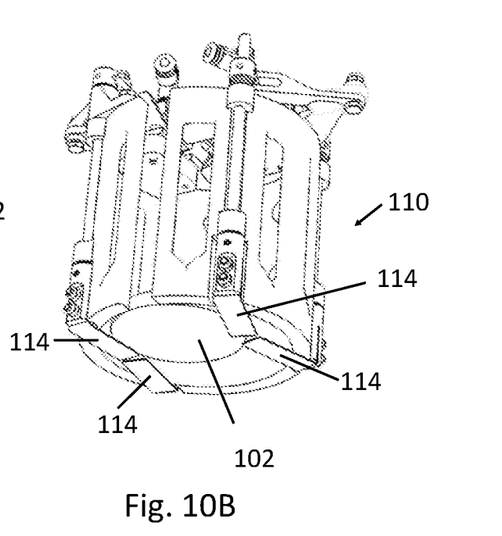
Figure 10C:
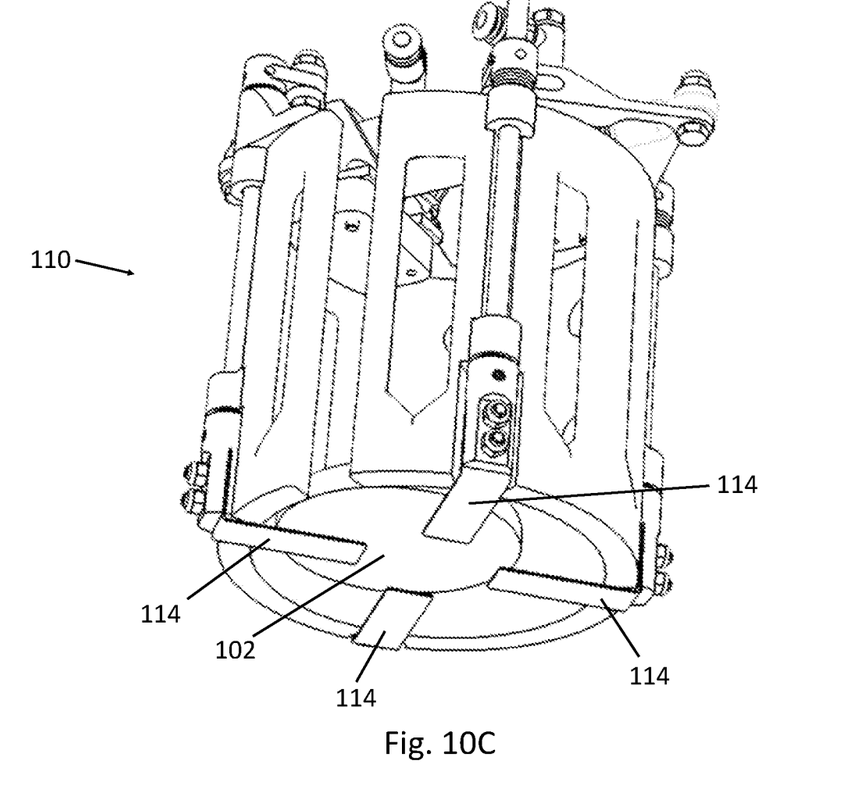

FIG. 10A-10C a further alternative version of the gripper 110 is shown, with again longitudinal wall elements 112. Here, the loading elements 114 are embodied as rotatable members 114 that are rotatable about rotation axis 114A so that the rotatable members 114 may be sled from a position outside of a retaining volume inside wall elements 112 (FIG. 10A) to a position below the products 102 to load and retain said products 102 (FIG. 10C). To reach the products 102 from below, the loading elements 114 are positioned at the free end of the retaining space, at the lower side of the retainer. In the position indicated in FIG. 10C, compared to the position indicated in FIG. 10A, a contact surface of the loading elements 114 has been displaced, by rotation, from a position relatively far away from the circumference of the product towards a position in which it contacts both the circumference and the lower surface of the product 102. Preferably the loading elements 114 may be embodied as thin metal plates.

Figure 11:
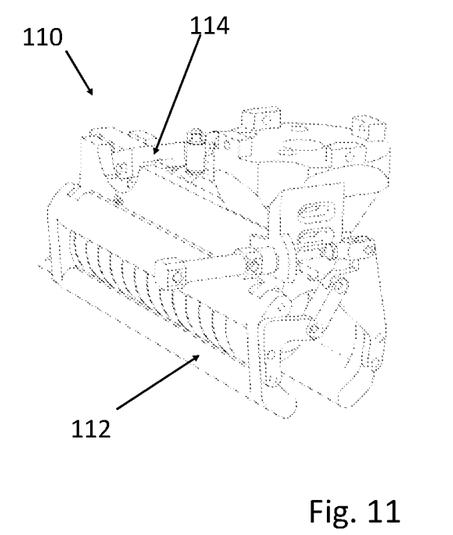
FIGS. 11, 12 and 13 show different views of a gripper according to the present invention in several operation states of unloading products.
Figure 12:
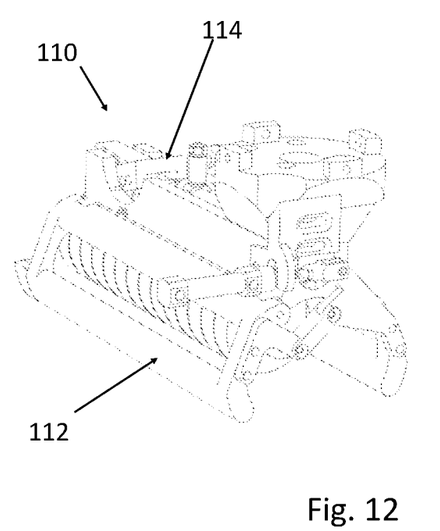
Figure 13:
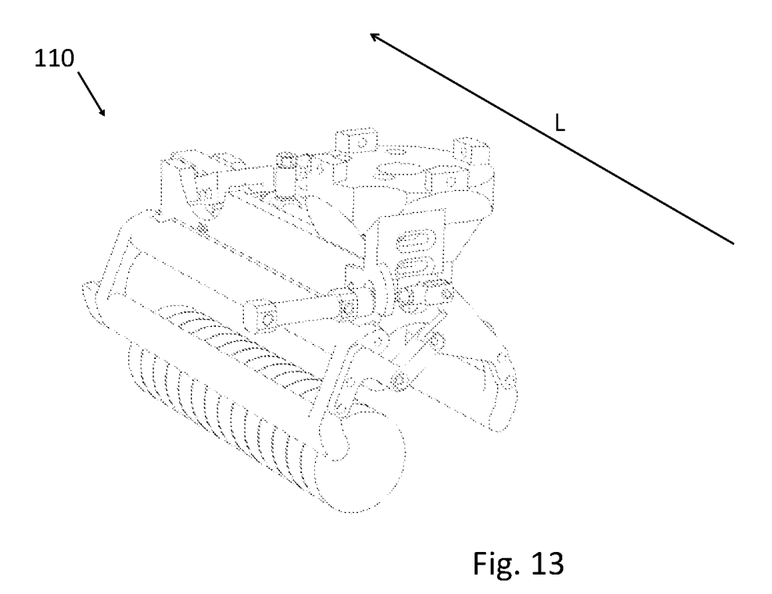

In FIGS. 11, 12 and 13 the gripper 110 is shown from another perspective in which the gripper is in all figures in an unloading state, meaning that the elongated wall elements are opening up over the full length of the retainer 111 such that the products may be unloaded all at the same time as shown in final FIG. 9. To this end, the wall of the retainer 111 comprises two separate elongated opposing wall elements 112 which are arranged to open up as jaws of a gripper.

Figure 14:
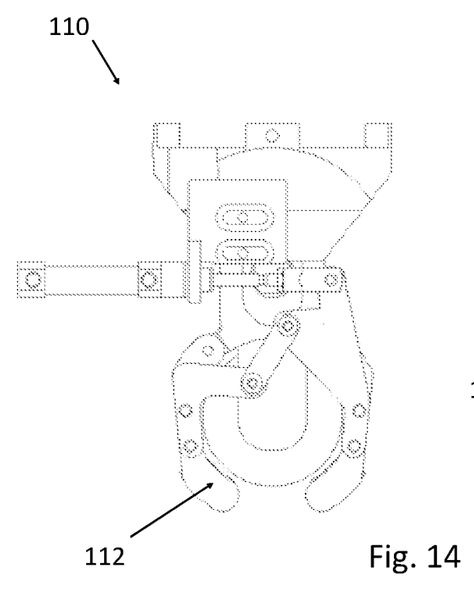
FIGS. 14, 15 and 16 show a front, back and side-view of a gripper according to the present invention.
Figure 15:
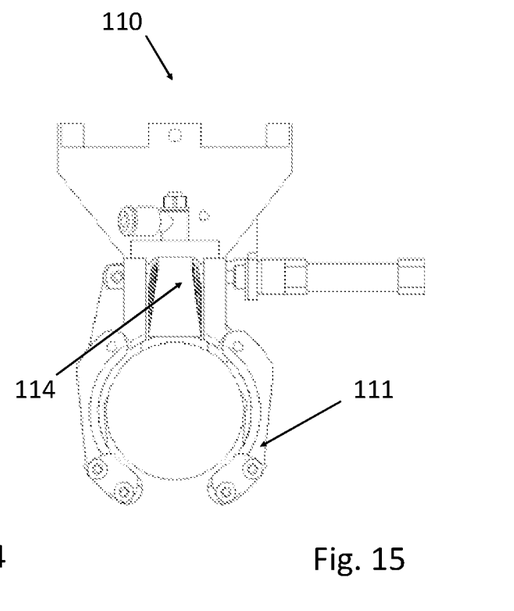
Figure 16:
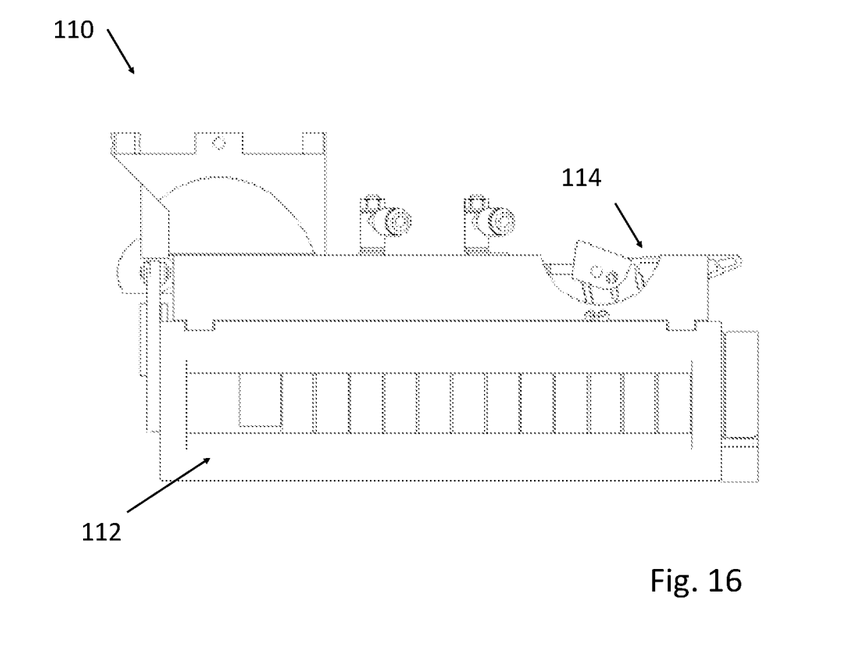

In FIGS. 14, 15 and 16 the gripper 110 is shown from a front, back and side view, in which the position, by way of example, of the elongated wall elements 112 and the loading element 113 are clearly illustrated.

Based on the above description, a skilled person may provide modifications and additions to the method and arrangement disclosed, which modifications and additions are all comprised by the scope of the appended claims.

It will be clear that the intention of the above description is to shed light on the working of possible embodiments of the present invention, and not to limit the scope of protection of the invention. Starting from the description, a person skilled in the art is able to conceive of and use various embodiments that fall within the inventive concept and scope of protection of the present invention.

What is claimed is:

1. A gripper for a handling device arranged for forming slugs of flat baked products, comprising a retaining space for holding slugs of flat baked products wherein said flat baked products are infeed by loading said flat baked products individually from a conveyor means at an input of said handling device, and outfeed by unloading said slugs into a conveyor means of a packing device at an output of said handling device, wherein said slugs are defined as rolls of on-edge oriented flat baked products, said gripper comprising:
a longitudinal retainer arranged for individually loading said flat baked products and comprising elongated wall elements extending along a longitudinal direction (L) of said gripper for enclosing said retainer forming a retainer space for retaining said flat baked products;
a loading element, arranged for displacement of at least a contact surface thereof which is located adjacent a segment of the circumference of a loaded flat baked product near a free end of said retaining space; and
wherein said gripper is arranged for displacement of said contact surface of said loading element enabling individually loading said flat baked products for forming said slugs in said retainer space, and wherein said gripper is further arranged for rotating said longitudinal retainer over a rotation-axis (R) in a plane parallel to a supporting surface of said conveyor means at said input for bringing said slugs from a vertical orientation (I) into a horizontal orientation (II), and wherein at least one of said elongated wall elements is arranged for displacement thereof for unloading said horizontally oriented slugs into said conveyor means of said packing device.

2. The gripper according to claim 1, wherein said displacement of said at least one elongated wall element upon unloading said horizontally oriented slugs comprises pivoting said at least one elongated wall element over a pivoting-axis parallel to a centerline of and located along a circumferential wall of said longitudinal retainer.

3. The gripper according to claim 1, wherein said longitudinal retainer comprises two opposing elongated wall elements extending along the longitudinal direction of said gripper forming a jaw of said gripper, and wherein said displacement of said two elongated wall element upon unloading said horizontally oriented slugs comprises pivoting said two elongated wall element over one or two pivoting-axis parallel to a centerline of and located along a circumferential wall of said longitudinal retainer.

4. The gripper according to claim 1, wherein said elongated wall elements comprise rods extending along the longitudinal direction of said gripper for enclosing said retainer forming the retainer space for retaining said flat baked products.

5. The gripper according to claim 1, wherein said gripper is arranged for at least three modus of operandi, comprising a loading, unloading and retaining modus, wherein in said loading modus said contact surface of said loading element is moved away from said segment of said circumference of the loaded flat baked product, for allowing further flat baked products to be loaded into said retainer, and wherein in said retaining modus said contact surface of said loading element is moved towards said segment of said circumference of the loaded flat baked product for retaining said loaded flat baked product near said free end of said retainer space, for retaining loaded flat baked products in said retainer, and wherein in said unloading modus said at least one elongated wall element is moved away from a center line of the retainer for unloading said slugs.

6. The gripper according to claim 5, wherein gripper is arranged for a further modus of operandi defining a gripper movement.

7. The gripper according to claim 5, wherein said gripper is arranged to be operated in said modus of operandi in a sequential manner, wherein a modus of operandi has ended before a further modus of operandi is started.

8. The gripper according to claim 5, wherein said gripper is arranged to be operated in modus of operandi in at least a partially overlapping manner, wherein before a modus of operandi has ended, a further modus of operandi has started.

9. The gripper according to claim 1, wherein said elongated wall elements comprise deformable material disposed at least on a contact surface of said wall elements and said flat baked products.

10. The gripper according to claim 1, wherein said at least one contact surface of said loading element comprises deformable material.

11. The gripper according to claim 1, wherein said loading element is comprised of deformable material.

12. The gripper according to claim 1, wherein said gripper is further arranged for rotating said longitudinal retainer over a further-rotation-axis perpendicular to said rotation-axis.

13. The gripper according claim 1, wherein said gripper comprises two, three or a plurality of loading elements, each being arranged for displacement of at least a contact surface thereof which is located adjacent a segment of the circumference of a loaded flat baked product near a free end of said retaining space, and wherein said loading elements are distributed around said free end of said retaining space for approximate equal distribution of said segments.

14. The gripper according to claim 1, wherein said gripper is configured for attaching to one of a delta-robot, scara-robot, linear robot, gantry robot, cylindrical robot or articulated robot.

15. A handling device arranged for forming slugs of flat baked products, said handling device comprising one or more robots having a gripper, wherein said flat baked products are infeed by loading said flat baked products individually by said robot from a conveyor means at an input of said handling device, and outfeed by unloading said slugs into a conveyor means of a packing device at an output of said handling device, wherein said slugs are defined as rolls of on-edge oriented flat baked products, said gripper of said comprising:
  a longitudinal retainer arranged for individually loading said flat baked products and comprising elongated wall elements extending along a longitudinal direction of said gripper for enclosing said retainer forming a retainer space for retaining said flat baked products
  a loading element, arranged for displacement of at least a contact surface thereof which is located adjacent a segment of the circumference of a loaded flat baked product near a free end of said retaining space; and
  wherein said gripper is arranged for displacement of said contact surface of said loading element enabling individually loading said flat baked products for forming said slugs in said retainer space, and wherein said gripper is further arranged for rotating said longitudinal retainer over a rotation-axis in a plane parallel to a supporting surface of said conveyer means at said input for bringing said slugs from a vertical orientation into a vertical horizontal, and wherein at least one of said elongated wall elements is arranged for displacement thereof for unloading said horizontally oriented slugs into said conveyor means of said packing device.

16. A handling device according to claim 15, wherein said robot comprises one of a delta-robot, scara-robot, linear robot, gantry robot, cylindrical robot or articulated robot.

17. A controller for controlling a robot of said handling device of claim 15.

* * * * *